United States Patent [19]

Kobayashi et al.

[11] 3,934,094
[45] Jan. 20, 1976

[54] FREQUENCY BAND CONVERTER
[75] Inventors: Masaharu Kobayashi, Hachioji; Tsuneji Koshikawa, Sayama; Toshio Tanizoe, Hitachi, all of Japan
[73] Assignee: Hitachi, Ltd., Japan
[22] Filed: Aug. 27, 1973
[21] Appl. No.: 391,846

[30] Foreign Application Priority Data
Aug. 28, 1972 Japan.................................. 47-85368

[52] U.S. Cl. ...................... 179/15.55 T; 178/DIG. 3; 179/15.55 R
[51] Int. Cl.[2] ........................................ H04J 7/00
[58] Field of Search ................ 179/15.55 R, 15 BW, 179/15.55 T, 15 A; 178/6.6 A, DIG. 3; 325/38 B

[56] References Cited
UNITED STATES PATENTS
3,633,170   1/1972   Jones, Jr. ............................ 325/38 B
3,634,625   1/1972   Geohegan et al. ................ 179/1.5 A
3,749,836   7/1973   Hayami et al. ................... 178/DIG. 3
3,752,912   8/1973   Ohsawa et al. ................ 179/15.55 T Primary Examiner—Kathleen H. Claffy
Assistant Examiner—Tommy P. Chin
Attorney, Agent, or Firm—Craig & Antonelli

[57] ABSTRACT

A frequency band converter wherein a signal whose frequency band is to be converted is written in a random access memory at a predetermined cycle while the contents of the random access memory are read out sequentially at a cycle different from the writing cycle thereby to obtain a frequency band converted output signal.

5 Claims, 4 Drawing Figures

FREQUENCY BAND CONVERTER

This invention relates to a frequency band converter for effecting compression and expansion of the frequency band of a signal.

When an audio signal recorded at normal speed in, say, a tape recorder is reproduced at a speed higher than the normal speed, the reproduction time is shortened while at the same time the frequency band of the voice is accordingly increased. The reproducing of the signal at a speed lower than the normal speed, on the other hand, causes the reproduction time to be expanded, reducing the frequency band of the voice. Therefore, in order to restore the frequency band of the signal to the normal audio frequency band, it is necessary to change the speaking speed, that is, tempo without adversely affecting the pitch, timbre or the intelligibility of the voice.

Also, divers who are often required to breathe in an atmosphere filled with helium under pressure in doing their jobs fail to hold oral communication with others, since in such an atmosphere the frequency band of human voices is naturally multiplied. For this reason, it is necessary to convert the speech into normal audio frequency band without any substantial distortion.

Further, it is often necessary to convert the frequency band of a signal by compressing and expanding it in signal transmission.

The conventional device for conversion of frequency band for similar purposes, as disclosed in U.S. Pat. No. 3,621,150, comprises a pair of shift registers in which input signals are alternately stored at a predetermined sampling cycle, while the contents of the registers not in a storage state are read at a cycle different from the sampling cycle thereby to effect the expansion and compression of the frequency band of the input signals. In such a device, however, the length of signal interval is equal to a length of time represented by the product of the sampling cycle and the number of stages of each shift register. Therefore, the smaller the number of stages of each shift register, the shorter the length of signal interval, with the result that a shortened period of click noises due to the occurrence of gaps between signal intervals gives rise to a great noise. Increasing the number of stages with the intention of preventing such noises leads to the disadvantage of an increased memory capacity for increased cost.

Accordingly, it is an object of the present invention to provide a frequency band converter in which the length of signal intervals is increased thereby to lengthen the period of click noises.

Another object of the invention is to provide a low-cost frequency band converter.

According to one aspect of the present invention there is provided a frequency band converter comprising random access memory means, input means connected to said random access memory means for writing in said random access memory means at a predetermined writing cycle a signal whose frequency band is to be converted, output means connected to said random access memory means for reading the contents of said random access memory means at a cycle different from said writing cycle and producing a frequency band converted output, and control means connected to said random access memory means for controlling the writing and reading operations of said random access memory means.

The above and other objects, features and advantages of the present invention will become apparent when reading the following detailed description in conjunction with the accompanying drawings in which.

Figure 1:
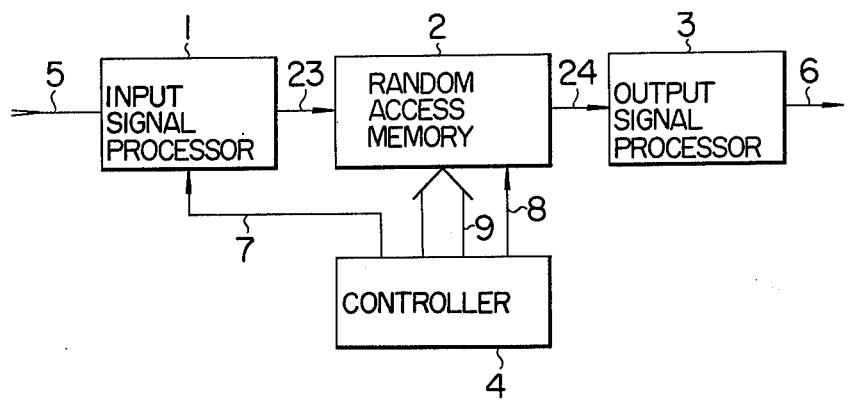
FIG. 1 is block diagram showing the fundamental construction of the frequency band converter according to the present invention.

Referring to FIG. 1 showing the fundamental construction of the frequency band converter according to the present invention, reference numeral 1 shows an input signal processor, numeral 2 a random access memory, numeral 3 an output signal processor, numeral 4 a controller, numeral 5 a signal line for an input signal whose frequency band is to be converted, numeral 6 a signal line for an output signal which is the result of frequency band conversion, numeral 7 a signal line for pulses of a predetermined cycle which is used for signal input, numeral 8 a signal line for read control pulses, and numeral 9 a signal line for a signal designating a memory address. Numerals 23 and 24 show signal lines for write and read signals respectively.

In this arrangement, the input signal which is a signal with its frequency band to be converted is applied to the input signal processor 1 through the signal line 5, wherefrom an input signal coinciding with the pulses of a predetermined cycle applied from the controller 4 by way of the signal line 7 is applied through the signal line 23 to the random access memory 2 as a write signal. The write signals from the input signal processor 1 are written in the random access memory 2 sequentially while being controlled by the write control pulses applied from the controller 4 through the signal line 8. The address of the memory at which the signal is written in is designated by the memory address designating signal sent from the controller 4 through the signal line 9. The information written in the memory 2 is sequentially read out at a cycle different from the cycle of the pulses in the signal line 7, the reading address being designated also by the memory address designating signal in the signal line 9. The signal read out of the memory 2 and produced in the signal line 24 is processed by the output signal processor 3, so that a frequency band converted output signal is produced at signal line 6.

The writing and reading operations of the memory 2 will be explained in detail below.

Assuming that the memory capacity of the memory 2 is N bits, the input signal represented by the first pulse is stored in address 1, and the second pulse is stored in address 2. In like manner, the (N−1)th and Nth signals are stored in addresses (N−1) and N respectively. The (N+1)th signal is stored in address 1, while at the same time the first pulse having been stored in address 1 is erased and replaced by the (N+1) signal.

In similar fashion, the Mth signal is stored in the address K expressed by $K \equiv (M-1)(\mathrm{mod}_N) + 1$ wherein $(\mathrm{mod}_N)$ is a modulator to subtract from the value $(M-1)$ any multiple of $N$ which is the closest to but smaller than $(M-1)$, to obtain a remainder which is smaller than $N$.

The reading operation is performed in parallel to the above-mentioned writing operation. In the process, the information at addresses 1 to N is continuously read at a cycle different from the writing cycle in such a manner that when reading is reached to address N, reading is returned to address 1 for cyclically reading the contents of the memory.

The frequency band of input signal is converted at the ratio of $K_{conv} = T_w/T_r$ where $T_w$ is a writing cycle and $T_r$ a reading cycle. When $K_{conv}$ is larger than unity, the frequency band of the signal is compressed and the length of signal interval of the input signal thus compressed is expressed as the time interval from the time when the writing and reading operations have started at the same address at the same time to the time when the reading address catches up with the writing address next, that is, $$T_w \times N \times \frac{T_w}{T_w - T_r} = \frac{T_w^2 \times N}{T_w - T_r}.$$

The overlying period of signal interval in this case is $T_w \times N$.

When $K_{conv}$ is smaller than unity, on the other hand, the frequency band of a signal is expanded and the length of signal interval is expressed as $$T_w \times N \times \frac{T_w}{T_r - T_w} = \frac{T_w^2 \times N}{T_r - T_w}.$$

the signal being absent for the period $T_w \times N$.

Unlike the conventional device where the length of signal interval is always fixed at $T_w \times N$, the device according to the present invention is such that when the conversion ratio $K_{conv}$ is 0.8 or 1.25, for example, the length of signal interval is $T_{0.8} = 4 \times T_w \times N$ or $T_{1.25} = 5 \times T_w \times N$. This means that according as the ratio $K_{conv}$ approaches 1, the length of signal interval becomes longer, so that the cycle of click noises occurring between the signal intervals is greatly lengthened, thus substantially losing its character as a noise.

Figure 2:
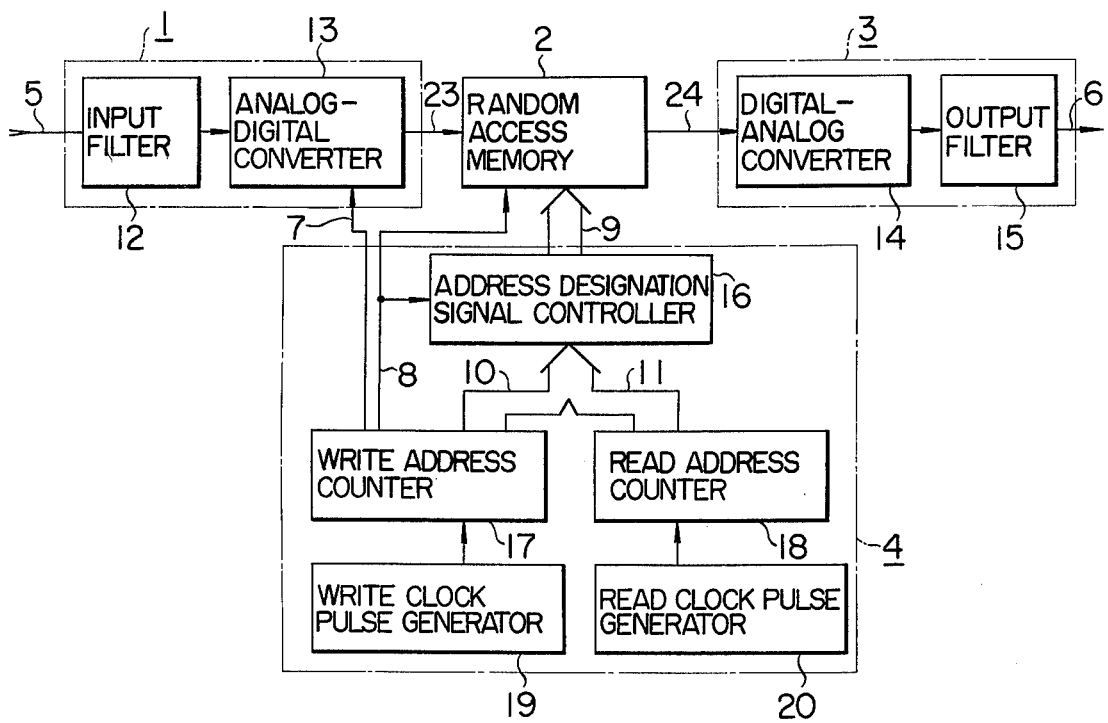
FIG. 2 is a block diagram showing an embodiment of the construction of the frequency band converter according to the present invention.

The diagram of FIG. 2 shows an actual example of the construction of the frequency band converter according to the invention in which an input signal is processed by being sampled into a digital signal. In the drawing, reference numeral 12 shows an input filter, and numeral 13 an analog-digital converter, the filter and converter making up the input signal processor 1 of FIG. 1. Reference numeral 14 shows a digital-analog converter circuit, and numeral 15 an output filter, both the circuits making up the output signal processor 3. Reference numeral 16 shows an address designation signal control circuit, numeral 17 a write address counter, numeral 18 a read address counter, numeral 19 a write clock pulse generator, and numeral 20 a read clock pulse generator, all of which constitute the controller 4.

In this arrangement, the memory 2 is ready to read under normal conditions, the writing operation being done only in response to a write control pulse through the signal line 8. Also, the address designation signal control circuit 16 selects the output of the output counter 18 under normal conditions, the output of the counter 17 being selected only in response to the control pulse 8.

The signal whose frequency band is to be converted is applied to the input filter 12 of the input signal processor 1 where only a required frequency band component is taken out and applied to the analog-digital converter 13, whereby it is converted into a digital signal at a predetermined sampling cycle by means of the sampling pulses applied thereto through the signal line 7 from the write address counter 17 of the controller 4. The converted signal is applied to the random access memory 2 by way of the signal line 23. The random access memory 2 starts its writing operation in response to the memory write control pulse applied from the write address counter 17 of the controller 4 through the signal line 8 in synchronism with the sampling pulse, thereby writing the sampled digital signal in the memory. In the process, the address designation signal control circuit 16 of the controller 4 is switched by the memory write control pulse, so that the address signal of the write address counter 17 is applied through the signal lines 10 and 9 as a memory address designating signal to the memory 2, in response to which the writing operation is effected at the addresses designated by the address designating signal.

In the absence of an applied control pulse, on the other hand, the memory is ready to read, so that the address signal of the read address counter 18 is applied through the signal line 11, through the address designating signal control circuit 16 and the signal line 9, to the memory 2 as a memory address designating signal, whereupon the contents of the designated address are read out. In this connection, the writing cycle $T_w$ which is a sampling cycle and the reading cycle $T_r$ are determined by the write clock pulse generator 19 and the read clock pulse generator 20 respectively.

The signal read out of the memory 2 and produced at the signal line 24 is converted into an analog signal by the digital-analog converter circuit 14 of the output signal processor 3 and then the required frequency component thereof is picked up by the output filter 15 thereby to produce at the signal line 6 a frequency band converted output signal 6.

The sampling pulse and the control pulse in the signal lines 7 and 8 respectively comprise bits generated as output pulses from the write address counter 17 in response to pulses from the write clock pulse generator 19. These pulses are generated from the counter 17 with the intention of pulse shaping. If such consideration is not required or the output of the clock pulse generator 19 is sufficiently shaped already, they may alternatively be taken out of the clock pulse generator 19 directly.

In the case where the memory 2 is ready to write under normal conditions, the read control pulses from the read address counter 18 or the read clock pulse generator 20 may be applied to the memory 2 and the control circuit 16. Further, the write control pulses and read control pulses may be utilized at the same time.

The device of the above-mentioned arrangement as it is applied to the conversion of audio frequency band for the tape recorder will be explained below.

If the voices recorded in the tape at normal speed are reproduced at a speed of twice the recording speed, the reproducing time is reduced by one-half, whereas the frequency band is doubled. For example, the frequency band of an input audio signal as it is reproduced at normal speed is 3 KHz, whereas the frequency band thereof as it is reproduced at a speed twice its normal reproduction speed is 6 KHz. For this reason, according to the present invention, the operation of writing in the random access memory is effected with the frequency of sampling pulses 7 maintained at 12 KHz. The signal thus written in is read out at 6 KHz, whereby the signal is compressed into 6 KHz which is the same frequency band as at the time of reproduction at normal speed. If the voices recorded in tape are reproduced at half speed, the reproduction time doubles, while the frequency band is reduced by one half. If, as in the preceding case, the frequency band of the input audio signal as it is reproduced at normal speed is 3 KHz, the frequency band of the signal as it is reproduced at half the speed is 1.5 KHz. Thus, the invention is characterized in that the operation of writing in the memory 2 is effected with the frequency of the sampling pulses 7 maintained at 3 KHz. The signal thus stored is read out at 6 KHz, thereby expanding the frequency band of the signal to 3 KHz as in the reproduction at normal speed.

Figure 3:
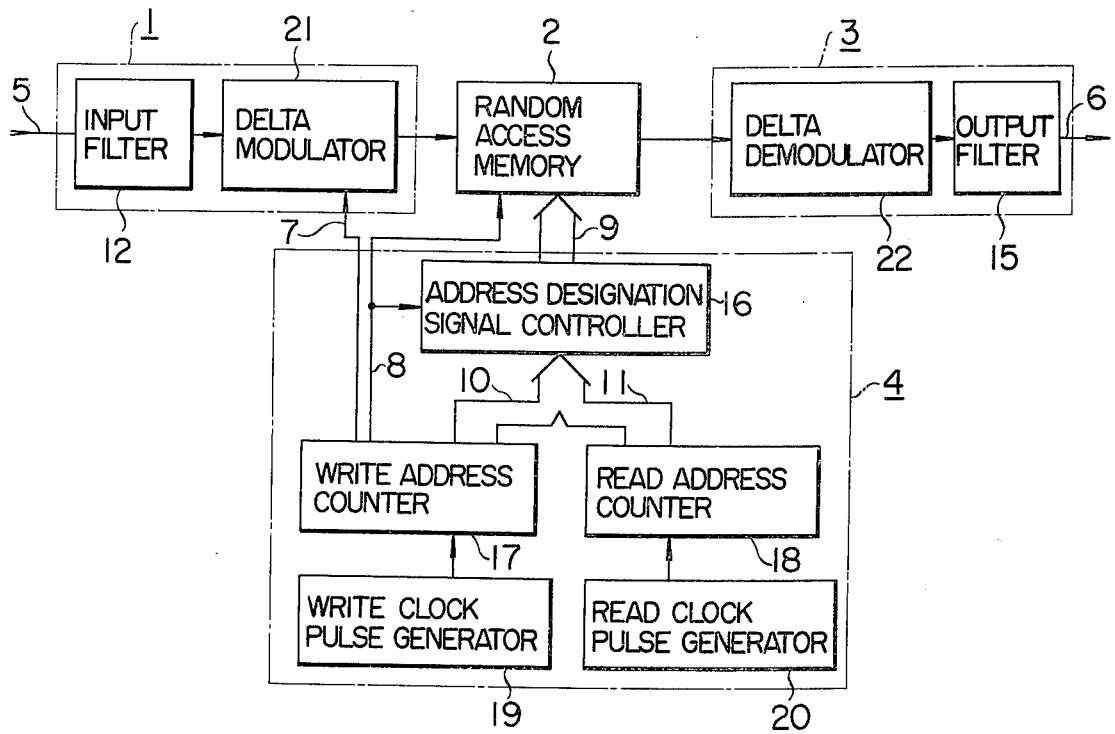
FIGS. 3 and 4 are block diagrams showing actual constructions according other embodiments of the frequency band converter of the invention.

The block diagram of FIG. 3 shows an actual example of the construction of the frequency band converter according to another embodiment of the invention, in which the input signal is delta-modulated.

In the drawing under consideration, reference numeral 21 shows a delta modulator, and numeral 22 a delta demodulator, the other arrangement being quite the same as the arrangement shown in FIG. 2. In this arrangement, the signal in signal line 5 the frequency of which is to be converted is delta-modulated by the delta modulator 21 after being filtered by the input filter 12, and then it is stored in the random access memory 2 controlled by the controller 4, while it is read out as it is controlled by the controller 4, so that it is demodulated into an original signal by the delta demodulator 22. The resulting demodulated signal is applied through the output filter 15 and produced in the signal line 6 in the form of a frequency band converted output signal.

The processing by delta modulation as mentioned above enables the digital-analog converter circuit 13 and the analog-digital converter circuit 14 to be replaced by the delta modulator 21 and the delta demodulator respectively, thus greatly simplfying the circuit construction.

Figure 4:
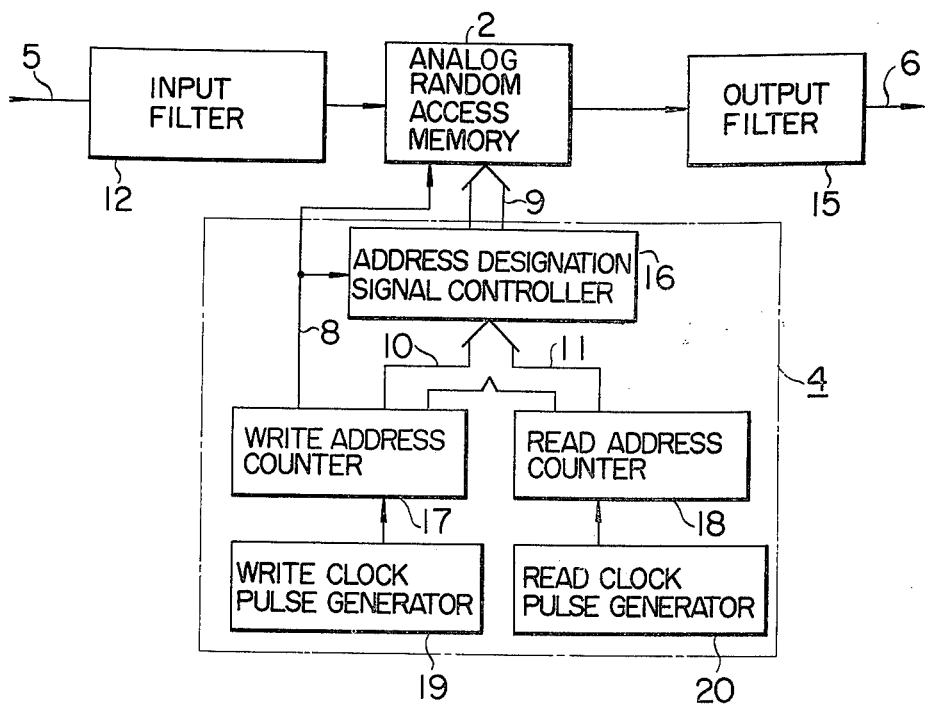

Still another embodiment of the construction of the frequency band converter according to the present invention is shown in FIG. 4, in which the analog signal itself is processed.

The embodiment of FIG. 4 is different from the embodiment of FIG. 2 in that in the embodiment of FIG. 4 the need for the analog-digital converter circuit 13 and the digital-analog converter circuit 14 is eliminated and an analog memory is used as the random access memory 2.

By this arrangement, the signal before frequency conversion is filtered and the required component of frequency band thereof taken out by the input filter 12, directly followed by the storage thereof in the analog memory 2. The analog signal read out of the analog memory 2 is applied through the filter 15 wherefrom it is taken out as an output signal 6 which is the result of frequency band conversion.

In this case, neither the circuit 13 nor the circuit 14 is required, thus making possible further simplication of the device.

It will be apparent from the above description that according to the present invention a random access memory is used to write and read an input signal at appropriately selected writing and reading cycles, thus realizing a frequency band converter of simple construction without substantially eliminating noise which has a great length of signal interval.

What we claim is:

1. A frequency band converter for modifying time and pitch of a speech signal shifted in frequency, comprising:

random access memory means having storage addresses of a predetermined number;

control means for supplying to said random access memory means a write-in access control signal at a first rate as well as a read-out access control signal at a second rate so as to cause the respective storage addresses of said random access memory means to be accessed one after another in a predetermined cyclic order at the first rate in response to the write-in access control signal and also at the second rate in response to the read-out access control signal, respectively, one of the first and second rates being different and variable with respect to the other, said control means giving precedence to one of the write-in and read-out access control signals with respect to the other only when both said write-in and read-out access control signals are concurrently supplied to said random access memory means;

input means for receiving the frequency shifted speech signal and for intermittently writing sampled pieces of information of the frequency shifted speech signal in the respective storage addresses of said random access memory means which are accessed only in accordance with the write-in access control signal in the predetermined cyclic order at the first rate despite interchangeable access of the storage addresses of said random access memory means in accordance with the read-out access control signal so that each of the storage addresses of said random access memory means accessed in accordance with the write-in access control signal stores one sampled piece of information which is replaced with another sampled piece of information applied to the same address after cyclic access of said random access memory means; and output means for intermittently reading out the pieces of information stored in said random access memory means from the storage addresses of said random access memory means which are accessed only in accordance with the read-out access control signal in the predetermined cyclic order at the second rate despite interchangeable access of the storage addresses of said random access memory means in accordance with the write-in access control signal, whereby the sampled pieces of information of the frequency shifted speech signal are successively written in said storage addresses of the random access memory means one after another by said input means independently of the reading operation of the thus stored piece of information from said storage addresses of the random access memory means one after another by said output means such that pieces of information read out by the output means are periodically discarded from the pieces of information stored when the first rate is faster than the second rate or pieces of information read out by the output means are periodically repeated in the pieces of information stored when the first rate is slower than the second rate, each discard or repetition being limited at most to the sampled pieces of information stored in the addresses of only one cyclic order.

2. A frequency band converter according to claim 1, wherein:
said input means includes an analog-digital converter for receiving and converting the frequency shifted speech signal into digital signals representing the sampled pieces of information of the speech signal and for writing the digital signals in said random access memory means at the first rate; and
said output means includes a digital-analog converter for reading-out and converting the digital signals from said random access memory means into analog signal at the second rate.

3. A frequency band converter according to claim 1, wherein:
said input means includes delta modulator means for receiving and delta-modulating the frequency shifted speech signal supplied thereto and for writing the output signal of said delta-modulator means in said random access memory means at the first rate in accordance with the write-in access control signal; and
said output means includes demodulator means for reading the stored informations from the respective storage addresses of said random access memory means at the second rate in accordance with the read-out access control signal and for delta-demodulating the thus read-out signals.

4. A frequency band converter according to claim 1, wherein:
said random access memory means is an analog memory means for storing analog pieces of information in the respective storage addresses thereof;
said input means receives the frequency shifted speech signal and writes-in sampled analog pieces of information thereof in the storage addresses of said random access memory means in accordance with the write-in access control signal; and
said output means reads-out the informations from the storage addresses of said random access memory means in accordance with the read-out access control signal.

5. A frequency band converter according to claim 1, wherein said control means comprises:
write clock pulse generator means for generating write clock pulses which regulates the first rate;
read clock pulse generator means for generating read clock pulses which regulates the second rate;
write address counter means for counting the write clock pulses so that the counted content thereof designates the address to be accessed for write-in operation;
read address counter means for counting the read clock pulses so that the counted content thereof designates the address to be accessed for read-out operation; and
address designation signal controller means for selectively applying the contents of said write address counter means and said read address counter means to said random access memory means with precedence of one over the other; said input and output means being controlled by the write clock pulses and read clock pulses, respectively.

* * * * *